United States Patent [19]
Ossenkop

[11] Patent Number: 5,132,010
[45] Date of Patent: Jul. 21, 1992

[54] IN-LINE OIL-SEPARATING EQUIPMENT WITH MEANDERING FLOW

[76] Inventor: Wilhelm Ossenkop, Obernhagen 2, 3252 Hess, Oldendorf 3, Fed. Rep. of Germany

[21] Appl. No.: 533,145

[22] Filed: Jun. 6, 1990

[51] Int. Cl.$^5$ ................................................ C02F 1/40
[52] U.S. Cl. ...................... 210/121; 210/522; 210/540
[58] Field of Search ............... 210/521, 522, 540, 104, 210/109, 538, 123, 121

[56] References Cited

U.S. PATENT DOCUMENTS

| | | | |
|---|---|---|---|
| 365,259 | 6/1887 | Ide | 210/540 |
| 748,981 | 1/1904 | Oliver | 210/540 |
| 801,330 | 10/1905 | Moore | 210/540 |
| 1,612,557 | 12/1926 | Weisgerber | 210/540 |
| 1,672,583 | 6/1928 | Travers | 210/807 |
| 2,284,737 | 6/1942 | Hirshstein | 210/540 |
| 3,912,533 | 10/1975 | Heyer | 210/522 |
| 4,728,440 | 3/1988 | van Kuijeren | 210/540 |
| 4,980,070 | 12/1990 | Lieberman | 210/522 |

*Primary Examiner*—Stanley S. Silverman
*Assistant Examiner*—Christopher Upton
*Attorney, Agent, or Firm*—Longacre & White

[57] ABSTRACT

Equipment for the in-line separation of oil from water, comprising a container with an intake and an outlet and partitions located therebetween so that meandering flow top to bottom through the container results. Overflow apertures located in the upper container region discharge the separated oil. As a result of this configuration, separation shall be more complete and more rapid than in known equipment and/or that the required purification is achieved in one pass. The upper edges of the partitions are located in the same height zone as the lower edges of the overflow apertures.

14 Claims, 2 Drawing Sheets

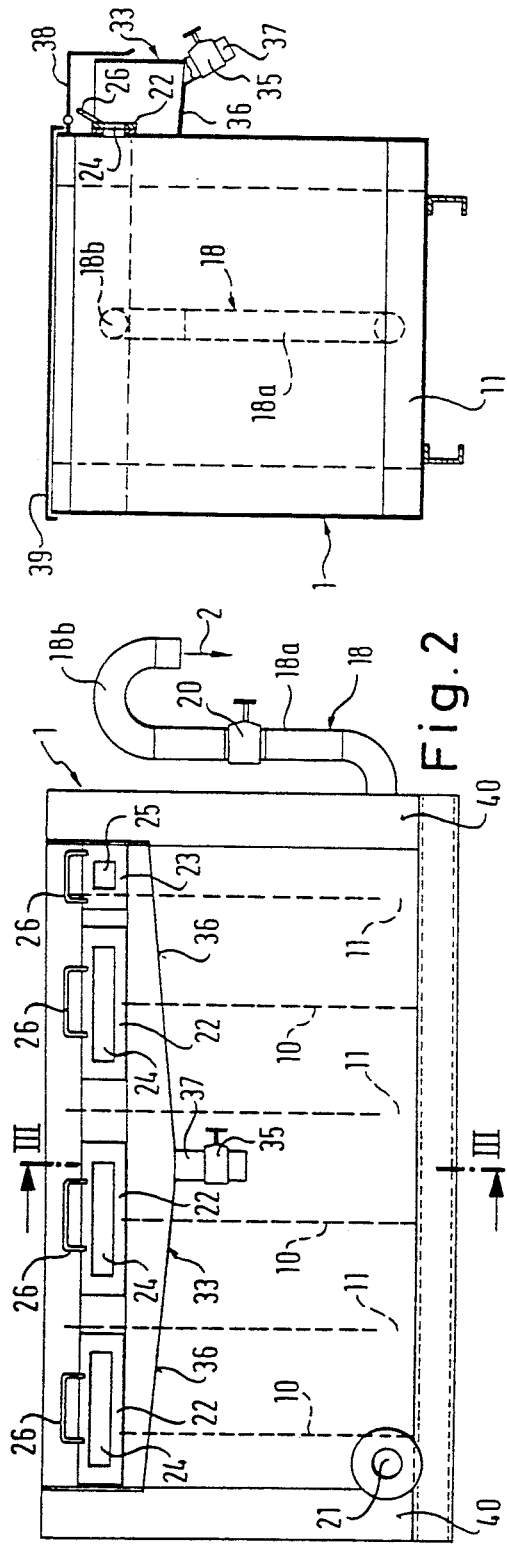
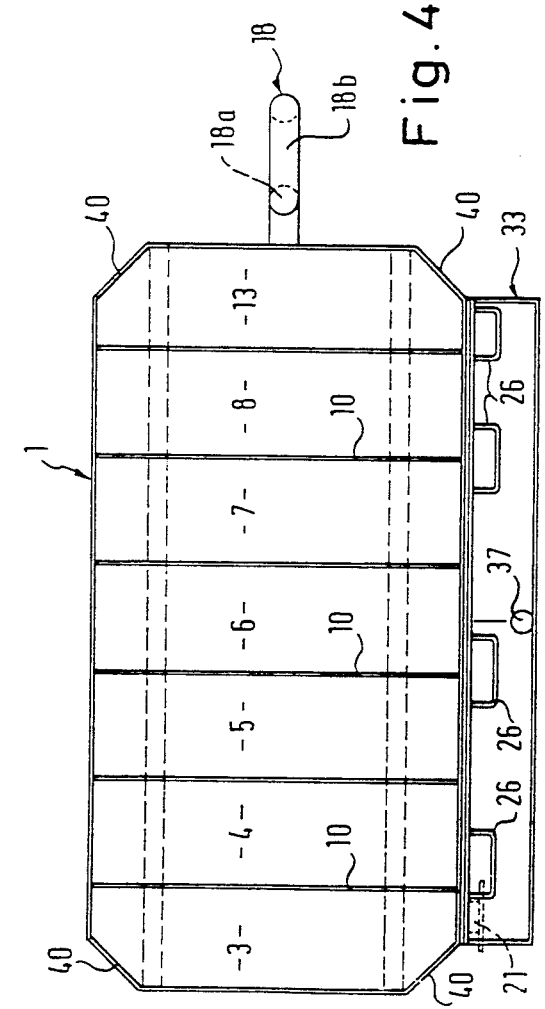

IN-LINE OIL-SEPARATING EQUIPMENT WITH MEANDERING FLOW

FIELD OF THE INVENTION

The invention is directed to equipment for in-line separation of oil from water. More specifically, the invention includes a container with an intake and an outlet and a series of partitions therebetween. The entering water and oil being separated from below and above so that a meandering flow from top to bottom and vice-versa through the container results. Overflow apertures to discharge the separated oil are located in the upper region of the container.

BACKGROUND OF THE INVENTION

In known equipment of this kind (U.S. Pat. No. 1,116,903), the partitions extending from bottom to top only extend partly above the liquid level and therefore the water being purified which is above the upper edges of these partitions cannot be affected by this meandering flow. As a result, separation will only be in the form of settling and shall be comparatively time-consuming and incomplete.

Accordingly it is the object of the invention to so design equipment of the cited kind so that the separation shall take place more completely and more rapidly than in the known equipment and/or that the required purification shall be achieved in one pass through the separator apparatus.

SUMMARY OF THE INVENTION

The invention provides that the upper edges of the partitions extending from bottom to top of the separation container are at approximately the same height zone as the lower edges of the overflow apertures. Also, for each two consecutive chambers which share an upper liquid surface, i.e., share an upper liquid level, and which are communicating in their upper regions, the second chamber thereof communicates in its lower region with the first chamber of the next pair of chambers.

By means of this design, the liquid being purified is constrained to move only as far as the region of the lower edges of the overflow apertures so that the transfer of water still being contaminated into the particular next container segment shall be greatly reduced. Instead, the strongly contaminated water is constrained to move over the upper edges of the partitions in order to arrive at the next chamber, and since the lower edge of the overflow apertures and the upper edge of the partition are at the same height level, an additional separation effect shall be achieved.

After passing over and under the last consecutive portion, the purified water can be discharged from the lower region of the last chamber.

Because filter elements of any kind are eliminated in the design of the invention, clogging of small flow cross-sections is impossible. In particular, the overflow apertures of the present invention can be kept so large that clogging or soiling degrading the oil discharge can be excluded.

These overflows can assume rectangular shapes about 20 to 30 cm long and about 2 to 5 cm high. The upper edges of the partitions preferably shall be located some 20 mm below the lower edges of the overflows.

In preferred embodiment of the present invention, the lower edges of the overflows shall be vertically displaceable. For this purpose they can be provided with a common cover which can be moved from below toward the overflow aperture, and therefor make it possible to change the height of the lower edges of the overflow apertures. Such a design allows a very accurate adjustment of the liquid level in the equipment, especially in the case where separate individually adjustable covers are associated with the separate overflows. These covers may be in the form of sliders comprising rectangular openings and grips while being displaceable in vertical guides.

The height-adjustment of the covers and hence of the liquid levels can also be automated using a floater-switch controlling the drive of the covers.

The overflows empty into a common collecting vessel for the oil which thereby can be re-used.

The discharge of the container is connected to a gooseneck pipe with a vertical segment and an adjoining upper return bend which can be telescoped into and out of the vertical pipe segment. By adjusting the return bend by the order of millimeters, not only the liquid level, but also the flow through the equipment can be varied. If for instance the lower inner surface of the return bend descends below the liquid level, more liquid, i.e., water, can flow, whereby, in the event of little replenishment, the liquid level will drop, or if the drained liquid is being compensated, more flow will take place.

A container with a content of about 2 $m^3$, and a flow of 2,000 liters/hour were found appropriate. This means that the liquid will flow in about one hour through the container. Ordinarily the water being purified flows continuously through the container. If the flows are higher, rates up to 8,000 liters/h are possible.

The equipment of the invention can be made comparatively compact in an especially advantageous manner and still remain efficient. The compactness allows the equipment to be movable so that it can be transported on vehicles to the appropriate sites. This offers the great advantage that the required [water] transport paths of the known equipment are eliminated because in the equipment of the present invention, the water may be drawn at the site and be returned purified.

The container may be also provided, at least near the intake, with chamfered vertical side edges to reduce water turbulence.

The pump must be such that the oil shall be preserved as much as possible from turbulence, that is, it must be prevented as much as possible from forming an emulsion in or with the water being purified. It may be appropriate therefore to use a rotary pump to move the water being purified into the separation container.

The equipment of the invention makes it possible in the above described manner to separate oil proportions up to 5% in a single pass and to such an extent that the purified water contains oil only in parts per thousands. Tests have shown that following one pass there remained only from 0.3 to 0.7 mg of carbon per liter of purified water.

The invention is described below in further detail in relation to an illustrative embodiment.

BRIEF DESCRIPTION OF THE DRAWINGS

FIG. 2 is a detailed elevation of the equipment of FIG. 1,

FIG. 3 is the section III—III of FIG. 2, and
FIG. 4 is the top view of the equipment of FIG. 2.

Figure 1:
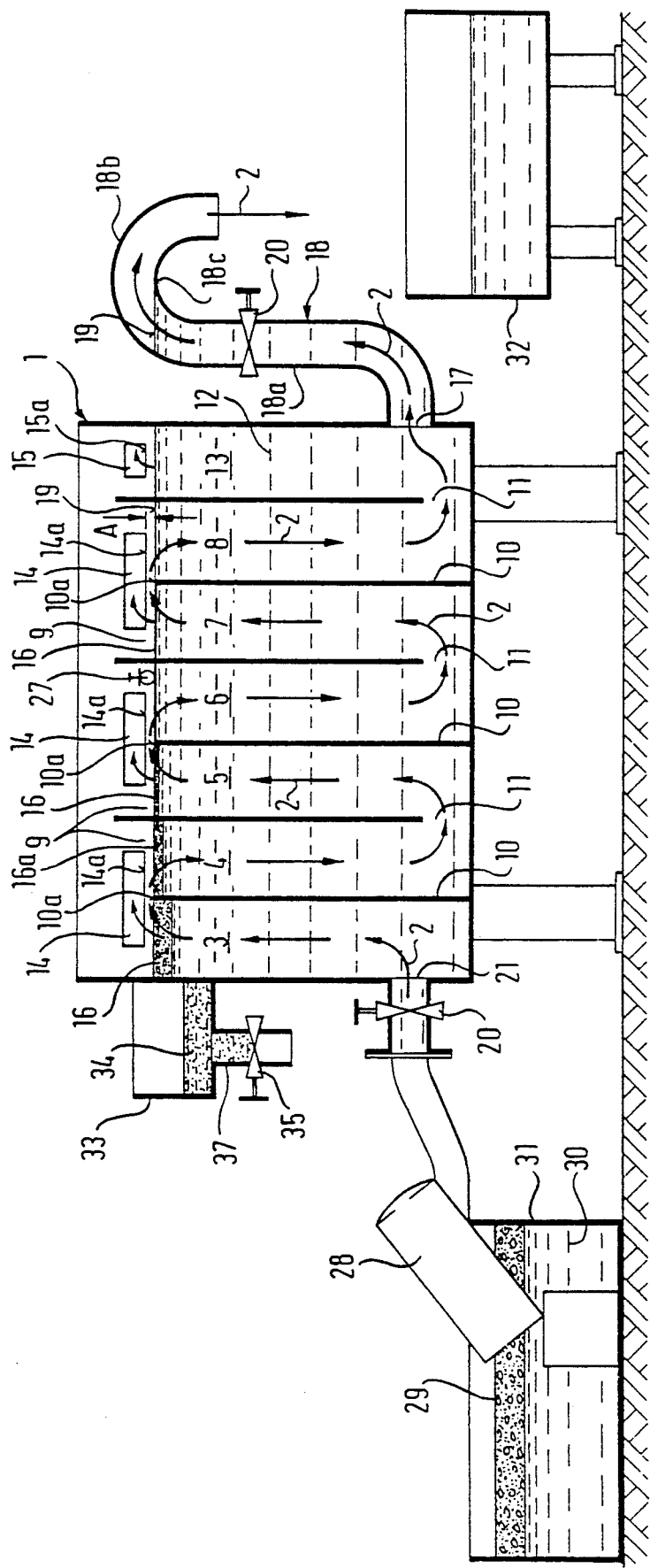
FIG. 1 is a schematic embodiment of the equipment of the invention.

DETAILED DESCRIPTION OF THE
PREFERRED EMBODIMENT

FIG. 1 shows a container 1 comprising several chambers 3 through 8 mounted consecutively as seen in the direction of flow. Every second consecutive chamber 3 and 4, 5 and 6, 7 and 8 communicate pairwise in their upper region. The partitions 10 between the chambers of the pairs allow the water being purified to overflow into the next consecutive chamber. The next chamber 4 and 6 of a pair of chambers communicates in its lower region at 11 with the next chamber of the next pair, with chamber 8 of the last pair communicating with a single chamber 13.

Accordingly, the flow 2 through the chambers is meandering, the water being purified always being made to pass from top to bottom and vice-versa as shown by the arrows.

Rectangular overflows, i.e., overflow apertures 14 and 15 are provided in the upper regions 9 of the pairs of chambers 3 through 8 and serve to discharge the separated oil. To allow the separated oil to discharge, the lower edges 14a and 15a of the overflow 14 and 15 are in the same height zone as the upper edges 10a of the partitions of a pair of chambers.

A discharge opening 17 is present in the lower region of the last single chamber 13 and is connected to a gooseneck pipe 18 consisting of a vertical segment 18a and a return bend 18b. The return bend 18b telescopes relative to the vertical segment 18a of the pipe 18. Because of the height adjustability of the return bend, the liquid level 19 in the chambers, and hence in the gooseneck pipe, is controllable. Simultaneously with this control, the rate of flow can be changed.

The vertical segment 18a of the pipe 18 is equipped with a shutoff valve 20, as is the intake 21 mounted in the lower region of the first chamber 3.

Covers 22 and 23 (FIG. 2) which can be displaced in vertical guides are associated with the individual overflow apertures 14 in order to vertically set their lower edges 14a. The covers themselves are provided with rectangular openings 24 and 25. These covers 22 and 23 may be provided with grips 26 (FIG. 2) to enable adjustment of the covers.

As shown by FIG. 2, the covers 22 and 23 can be adjusted for each overflow aperture individually, but they also may be linked to a crossbeam or the like and be adjusted jointly. Moreover the adjustment of individual or all covers may be automated by providing them with a drive spindle or the like, and being controlled from a floater switch (FIG. 1). Such a floater switch allows predetermining the particular relative position of the lower edges 14a of the overflow apertures 14 with respect to the fluid level, and keeping them accurately.

FIG. 1 furthermore shows a centrifugal pump 28 or a rotary pump conveying the water 30 being purified and covered by an oil foam 29 from a schematically indicated body of water such as a stream, lake or the like and represented in FIG. 1 as a vessel 31. In the representation of FIG. 1, the purified water is fed to a collecting vessel 32 which again itself may be the water to be purified.

The distance A between the lower edge 14a of the particle overflow aperture and the upper edge 10a of the partition 10 can be adjusted in relation to the particular conditions. It will be noted that the larger this distance, the less oil will be removed. However too short a distance would drain comparatively much water together with the oil through the overflow aperture 14. While in theory this distance also might be made negative, that is if the lower edges 14a of the overflow apertures 14 were below the upper edges 10a of the partitions 10, it was found appropriate to select a positive distance of about 20 mm.

The overflow apertures issue jointly into a collecting vessel 33 for the separated oil 34. This collecting vessel 33 is equipped at its lower side with a shutoff valve 35 to drain the oil.

FIG. 2 shows the container 1 of FIG. 1 in elevation and in particular displays an embodiment mode of the oil collecting vessel 33 with sloping bottom walls 36 guiding the oil to the center of the container, a drain pipe 37 being hooked up to the shutoff valve 35. As shown by FIG. 3, the pipe 37 may be slanted, whereby bottom walls 36 in addition to their slopes as shown in FIG. 2 further evince a downward slope externally away from the container 1. Because the collecting vessel 33 may be open upward, it is appropriately equipped with a tipping cover 38. Another cover 39 may seal the entire container 1.

FIG. 4 is the topview of the container 1 and shows that to minimize water turbulence, the container 1 is provided with chamfered vertical side edges 40.

The described equipment operates as follows:

The oil-laden water withdrawn by the centrifugal pump 28 from the body of water 31 to be purified and fed into the container 1 first arrives at chamber 3 where the oil layer 16 becomes surnatant. Because of the pumping pressure and a given pumping rate, the oil is forced over the lower edge 14a of the overflow aperture 14 at that location and flows in part through this aperture into the collecting vessel 33. The residual oil 16a together with the water flowing over the upper edge 10a of the partition 10 arrives at the next chamber 4. Simultaneously the upper oil-laden water layer flows over the lower edge 14a of the overflow apertures 14 and another layer farther down flows over the upper edge 10a of the partition 10.

This process is repeated next in chambers 5 and 6 and 7 and 8 respectively.

If oil should remain in the water being purified, it shall be removed in the last chamber 13 through the overflow aperture 15 of the last chamber 13.

In order to adjust the liquid level in the container and thereby to set optimal separation, either the covers 22 and 23 (FIG. 2) are adjusted individually or jointly, possibly by means of the floater switch 27, or the return bend 18b of the gooseneck pipe 18 is adjusted in height relative to the vertical segment 18a of this pipe. The latter method also allows changing the transmission rate in the manner already described.

I claim:

1. Equipment for in line separation of oil from water in an operating fluid, comprising:
   a container having an inlet and an outlet and having a bottom and surrounding side walls adapted to contain said operating fluid at an operating fluid surface level, a gooseneck pipe connected to said outlet and which has a vertical segment extending from said outlet, an upper return bend telescopically slidable on said vertical segment and adapted to regulate said operating fluid surface level, said container further including partitions positioned between said inlet and outlet to cause meandering flow of said operating fluid as said fluid flows from said inlet to said outlet, a first set of said partitions being fully sealed to said bottom and side walls of said container and allowing no communication of fluid therethrough, fluid passing only over an upper edge of said first set of partitions at said operating fluid surface level in said container, said first set of partitions dividing said container into chambers and being positioned alternately with a second set of partitions which are sealed to the sides of said container and allow passage of fluid beneath a bottom edge of said second set of partitions, and wherein an upper edge of said second set of partitions extends above said operating fluid surface level in said container, wherein operating fluid follows a meandering path of alternately passing over an upper edge of a partition of said first set and then passing beneath a bottom edge of a partition of said second set;

overflow apertures being provided in said side walls of said container at approximately said operating fluid surface level in said container, said overflow apertures positioned between each of said second set of partitions and in communication with said operating fluid as said fluid passes over an upper edge of a partition of said first set, said overflow apertures are rectangular and include a lower edge which is vertically displaceable so as to adjust the amount of operating fluid which can pass into said overflow apertures.

2. Equipment defined in claim 1, wherein the length of the rectangle is about 20 to 30 cm and its height is about 2 to 5 cm.

3. Equipment defined in claim 1, characterized in that the overflow apertures issue into a common collecting vessel receiving the separated oil.

4. Equipment defined in claim 1, wherein the container volume is about 2 m³ and said upper return bend is adapted to be telescopically slid to transmit from 2,000 liters/hour to 8,000 liters/hour.

5. Equipment as in claim 1, wherein said operating fluid is finally discharged from a lower region of a last successive chamber in said container.

6. Equipment as in claim 1, wherein the length of said overflow apertures in the direction of fluid flow as said operating fluid passes over said upper edge of a partition of said first set exceeds their height.

7. Equipment as in claim 1, wherein more than one overflow aperture is provided on a side of said container, each of said apertures on a side being provided with common cover means for simultaneous adjustment of said lower edge of said overflow apertures.

8. Equipment as in claim 1, wherein each of said overflow apertures further comprises a separate cover for adjustment of said lower edge, wherein each of said covers may be individually adjusted with respect to the overflow within the separate chamber with which each of said overflow apertures is associated.

9. Equipment defined in claim 8, wherein the covers are equipped with handles and can be displaced in vertical guides.

10. Equipment as in claim 8 further comprising driven mechanical adjustment means for drivingly adjusting the positions of said covers.

11. Equipment as in claim 10 wherein said covers comprise slide covers having rectangular apertures therein.

12. Equipment as in claim 10 wherein said mechanical adjustment means further includes a floater switch for controlling the actuation of said covers.

13. Equipment as in claim 8 wherein said covers comprise slide covers having rectangular apertures therein.

14. Equipment as in claim 1, wherein said upper edge of a partition of said first set is positioned approximately 20 mm below said lower edge of said overflow aperture.

* * * * *